April 21, 1931.  W. C. GEER  1,801,666
GAS IMPERVIOUS SHEET MATERIAL AND METHOD OF MAKING THE SAME
Filed June 26, 1925
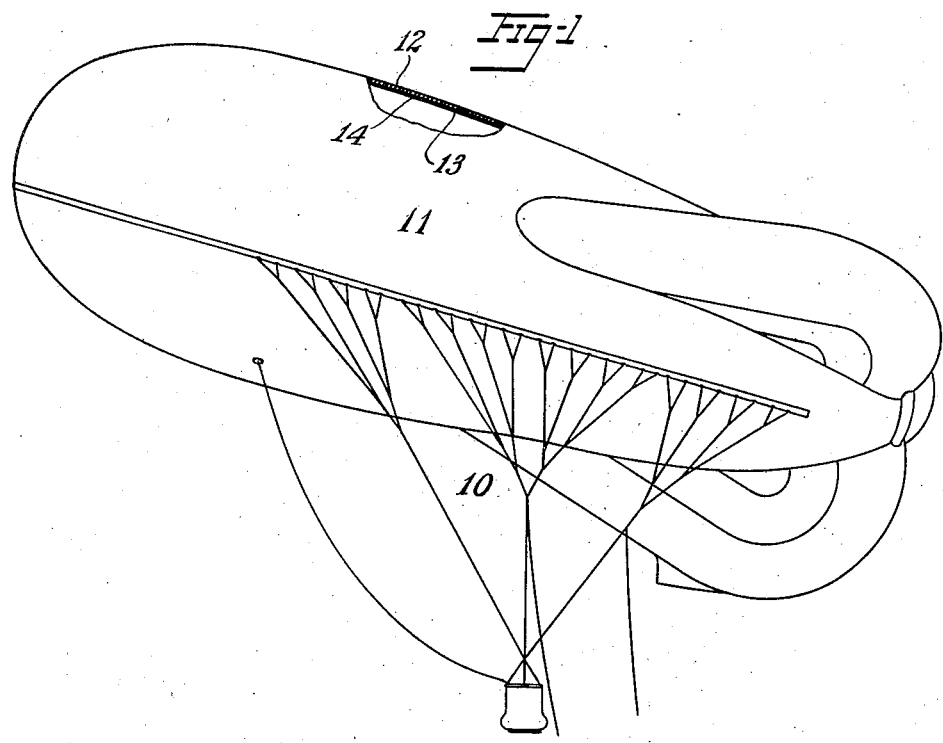
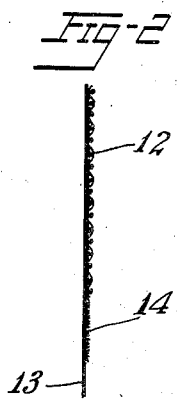
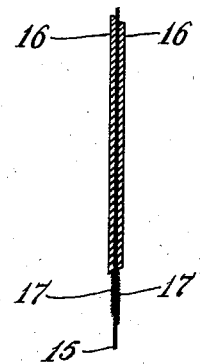
Inventor
William C. Geer
By Pierson, Cakin & Avery
Attys Patented Apr. 21, 1931

1,801,666

UNITED STATES PATENT OFFICE

WILLIAM C. GEER, OF AKRON, OHIO, ASSIGNOR TO THE B. F. GOODRICH COMPANY, OF NEW YORK, N. Y., A CORPORATION OF NEW YORK

GAS-IMPERVIOUS SHEET MATERIAL AND METHOD OF MAKING THE SAME

Application filed June 26, 1925. Serial No. 39,703.

This invention relates to gas impervious sheet material, particularly adapted for containers of low density gases such as are employed in the lighter-than-air type of air craft, and it has for an object to provide an inexpensive, light and durable material which shall be less pervious with respect to the lighter gases, such as hydrogen and helium, than envelope materials heretofore available.

In the past, it has been the common practice to employ in balloon construction a rubberized, close-woven fabric with an exterior coating of aluminum paint, which does not, however, greatly increase the imperviousness of the gas envelope, but is rather employed for the dual purpose of imparting to the balloon a low visibility and of preserving the rubber of the fabric from deterioration by the exclusion of light.

In the present invention, I provide a gas-impervious wall structure, suitable for the gas envelope of a balloon, consisting of a thin, flexible metal sheet or foil, which is highly impervious to gas diffusion, reenforced with a covering of tough, strong sheet material firmly adhered to one or both surfaces of the metal foil by any suitable bonding substance. The metal foil is preferably made of aluminum, or other metal or alloy capable of being formed into a tough, flexible, extremely thin sheet, and the reenforcing sheet is preferably a close-woven fabric, paper, rubber, or leather, and, where fabric or other absorbent fibrous sheet is used, it may be impregnated with a substance resistant to gas diffusion, similar to the rubberized balloon fabric now in common use.

I have found that aluminum may be rolled into a thin, tough sheet which not only is highly impervious to hydrogen, helium, and other light gases, but is also flexible to an unusual degree, and further on account of its resistance to corrosion and its light weight is particularly adapted for the wall structure of balloon envelopes. Tin foil, generally an alloy of tin and lead, is also well adapted for this purpose, and certain other alloys of copper, lead, bismuth, zinc, etc., are practicable and have the advantage of cheapness.

In order to secure most satisfactory results, the thin sheeted metal foil should be firmly and durably adhered to the reenforcing fabric. I have found that this may be accomplished by the use of suitable cements which are adhesive to rubber and to metals. Thus, cements having bases of rubber, gutta, balata and shellac may be employed. However, I find that certain heat-plastic rubber derivatives not only have a stronger adhesion for metals, and particularly for aluminum, but that they form a film which is highly impervious to gas diffusion. Such substances may be prepared by reacting crude rubber, under the influence of heat, with various isomerizing agents, particularly sulfonic compounds having the general formula $R-SO_2-X$, wherein $R$ represents an organic radical or a hydroxy group and $X$ represents a hydroxy group or chlorine.

Substances of this character are described in my prior application, Serial No. 8,057, filed January 6, 1925, the following being especially practical and commercially satisfactory: (1) the tough, non-friable reaction product of p-phenol sulfonic acid, 7½ parts by weight, and rubber, 100 parts, when heated in a compact mass from 4 to 10 hours at 260–290° F; or reaction products in which the phenol sulfonic acid is replaced by p-toluene sulfonyl chloride 9 parts, p-toluene sulfonic acid 7 parts, or other sulfonic acids and acid sulfonyl chlorides approximately 7 to 9 parts, (2) a similar reaction product of 4 to 5 parts of concentrated sulfuric acid (sp. gr. 1.84) with a mixture of 100 parts of rubber and 2 to 50 parts of pine tar, subjected to heat at 268° F. for 5 to 7 hours.

Of the accompanying drawings, Fig. 1 is a view in elevation of a balloon, broken away in part to show the wall structure of the gas envelope, and Figs. 2 and 3 are sections drawn to an enlarged scale of modified embodiments of my invention.

Referring to the drawings, I show in Fig. 1 a balloon 10 of the usual captive observation type having the wall structure 11 of the gas envelope made up of a rubberized woven-fabric 12 to which is adhesively secured a metal foil 13, as by a bonding film 14, the foil being shown disposed interiorly of the envelope. The metal foil 13, however, may be employed at the outer side of the envelope, as indicated in Fig. 2.

In constructing the gas-impervious sheet material in accord with my invention, the metal foil 13 and the reenforcing sheet 12, as for example woven fabric, are each coated on one side with a suitable cement, and, after the solvent has evaporated, are pressed together to form a firm union of the two. Where the heat-plastic substances of my prior application, Serial No. 8057, are employed, I may first apply a solution thereof to one side of the metal foil and bake in a dry heat. This gives a smooth, and flexible enamel surface of high imperviousness to gases. The enameled surface of the metal foil and the woven fabric may now be coated with a solution of the heat-plastic or with other suitable cement and joined by pressing together.

I find that where a rubberized balloon fabric is employed for reenforcing the metal foil, that a coating of a cement of the heat-plastic upon the aluminum and a coating of rubber cement on the fabric produce upon pressing the two together a very firm bond between the materials.

Alternatively, it is practicable in situations where it is desirable to protect the metal foil of gas-impervious sheet material from damage due to impacts with other bodies to apply a reenforcing material to both sides of the metal so that the foil is embedded between reinforcing layers. Thus, I have shown in Fig. 3, a gas impervious wall structure consisting of a metal foil 15 having reinforcing sheets 16 of vulcanized rubber adhered to either side thereof by a suitable cement 17, 17. Sheet material of this character is impervious to a high degree to the most penetrating gases and in addition may be employed in the construction of gas-masks being particularly proof against mustard gas.

Structures of the character hereinabove described may also be made with paper, leather and other flexible sheet materials as the reenforcing member of the gas-impervious sheet structure and it will be readily understood that numerous other variations and modifications in the construction of the gas-impervious sheet material herein described may be made without departing from the principles of this invention, and I therefore do not wholly limit the claims to the specific constructions herein set forth.

I claim:

1. The method of manufacturing a gas-impervious sheet material which comprises forming a thin, flexible sheet of aluminum, coating the sheet on one side with a tacky rubber isomer, subjecting the sheet to a temperature sufficient to flow the coating material and to form, when cool, an enamel coating on the aluminum sheet, and adhering a thin sheet of strong, flexible material to the coated surface of said metal sheet.

2. The method of making a gas-impervious sheet material which comprises forming a thin tough flexible gas-impervious film of a heat-plastic rubber isomer by coating a metal foil on at least one side with a rubber isomer, and subjecting it to heat adequate to flux and bake the rubber isomer, and reenforcing the gas-impervious sheet thus formed by adhering a fabric thereto.

3. The method of making a gas-impervious sheet material which comprises forming a thin tough gas-impervious film of a heat plastic rubber isomer by coating a metal foil on at least one side with a rubber isomer and subjecting it to heat adequate to flux and bake the rubber isomer film.

4. A gas-impervious sheet material comprising a film of a tough flexible heat-plastic rubber isomer protected on one side by a metal foil and reenforced on the other side by fibrous sheet material.

5. A gas-impervious sheet material comprising a film of a tough flexible heat-plastic rubber isomer baked on a metal foil.

6. A gas-impervious sheet material comprising a film of a tough flexible rubber isomer protected on one side by a metal foil and reenforced on the other side by fibrous sheet material.

7. A gas-impervious sheet material comprising a baked film of a tough flexible heat-plastic rubber isomer highly impermeable to gas diffusion.

In witness whereof I have hereunto set my hand this 11th day of June, 1925.

WILLIAM C. GEER.